June 13, 1967     P. H. CARTER ETAL     3,324,537
MACHINE FOR ASSEMBLING COLLARS AROUND THE NECKS OF BOTTLES
Filed Aug. 7, 1964     8 Sheets-Sheet 1

INVENTORS
PAUL H. CARTER
THOMAS E. MARION

BY Albert J. Kramer
ATTORNEY

June 13, 1967   P. H. CARTER ETAL   3,324,537
MACHINE FOR ASSEMBLING COLLARS AROUND THE NECKS OF BOTTLES
Filed Aug. 7, 1964   8 Sheets-Sheet 2

INVENTORS
PAUL H. CARTER
THOMAS E. MARION

BY *Albert J. Kramer*

ATTORNEY

INVENTORS
PAUL H. CARTER
THOMAS E. MARION

BY *Albert J. Kramer*

ATTORNEY

INVENTORS
PAUL H. CARTER
THOMAS E. MARION

BY *Albert J. Kramer*

ATTORNEY

INVENTORS
PAUL H. CARTER
THOMAS E. MARION

BY *Albert J. Kramer*
ATTORNEY

June 13, 1967  P. H. CARTER ETAL  3,324,537
MACHINE FOR ASSEMBLING COLLARS AROUND THE NECKS OF BOTTLES
Filed Aug. 7, 1964  8 Sheets-Sheet 7

INVENTORS
PAUL H. CARTER
THOMAS E. MARION

BY *Albert J. Kramer*

ATTORNEY

FIG. 19.

United States Patent Office 3,324,537
Patented June 13, 1967

3,324,537
MACHINE FOR ASSEMBLING COLLARS AROUND THE NECKS OF BOTTLES
Paul H. Carter and Thomas E. Marion, Baltimore, Md., assignors to Universal Machine Co., Inc., Baltimore, Md., a corporation of Maryland
Filed Aug. 7, 1964, Ser. No. 388,096
7 Claims. (Cl. 29—208)

This invention relates to assembling machines and it is more particularly concerned with a machine for assembling frusto-conical collars over the necks of bottles such as bottles of beverages conventionally packed in wooden cases.

Soft drinks, beer and other beverages are sold in bottles that are packed in wooden cases, usually 12 or 24 bottles to the case. Some cases are compartmentized to provide a pocket for each bottle. Other cases are open without compartments to receive a group of separate cartons of bottles, usually 6 bottles to each carton, sometimes referred to as "6 Paks." These "6 Paks" are adapted for carrying by a person and some forms thereof are provided with hand carrying means usually in the form of a median panel between two rows of three bottles, each having an opening for inserting the hand and grasping the unit. The necks of the bottles in both forms project above the body of the wooden case or are exposed at the top and provide an excellent place for advertising by means of paper collars placed on the necks. Such paper collars are admirably adapted to carrying messages of advertisements, recipes, announcements, contests, etc., from the manufacturer to the consumer. These paper collars can also be used as redemption coupons. However, the placement of these collars on the bottles are quite tedious by hand and can only be justified economically if they can be placed on the bottles rapidly and at low cost.

Accordingly, the general object of the invention is the provision of a machine for assembling such collars around the necks of bottles disposed in cases.

Another object is the provision of such a machine which receives cases of bottles on a conveyor, manipulates each case to a position for receiving the collars and then deposits the collars on all bottles of the case simultaneously.

Another object is the provision of such a machine which is capable of operating on cases both of the compartmentized type and cases of the "6 Pak" type.

These and still further objects, advantages and features of the invention will be apparent from the following description considered togther with the accompanying drawing.

Referring with more particularity to the drawing, the embodiment illustrated comprises a conventional roller conveyor 21 actuated by a belt drive 22 powered by an electrical motor 23.

At a convenient station along the conveyor, a dispensing unit 24 is secured. The dispensing unit comprises a frame structure that includes legs 25, 26, 27 and 28, in addition to other structural members necessary to provide a rigid structure for supporting the various parts of the unit, hereinafter more fully described.

The frame of the unit 24 carries a set of cylindrical tubes 29 arranged in groups of four. For a case of 24 bottles, six such groups would be used. The tubes of each group are welded together and are provided with mounting bars 30. The groups are disposed within enclosures formed by walls 31, 32, 33 and 34 and retained therein by bolts 35 threadedly engaged with aperture 36 in the enclosure walls and projecting into unthreaded apertures 37 of the mounting bars 30. The tubes 29 are each adapted to receive a stack of nested frusto-conical collars 38. The bottom of the tubes are provided with detents in the form of tabs 39 that retain the stacks in position within the tube but against which the bottommost collars of the stacks can be inwardly flexed and withdrawn by forces acting downwardly against it.

At the center of each group of four tubes there is an opening 40 in which is disposed for vertical reciprocation a vertical sleeve 41 having a square cross-section at its lower portion and a circular cross-section at its upper portion.

These sleeves are secured in pairs by clamps 42 to horizontal bars 43. The horizontal bars 43 are connected together by a beam 44 extending along the bottom sides of the bars 43 to which they are secured by bolts 44A.

Figures 1, 4:
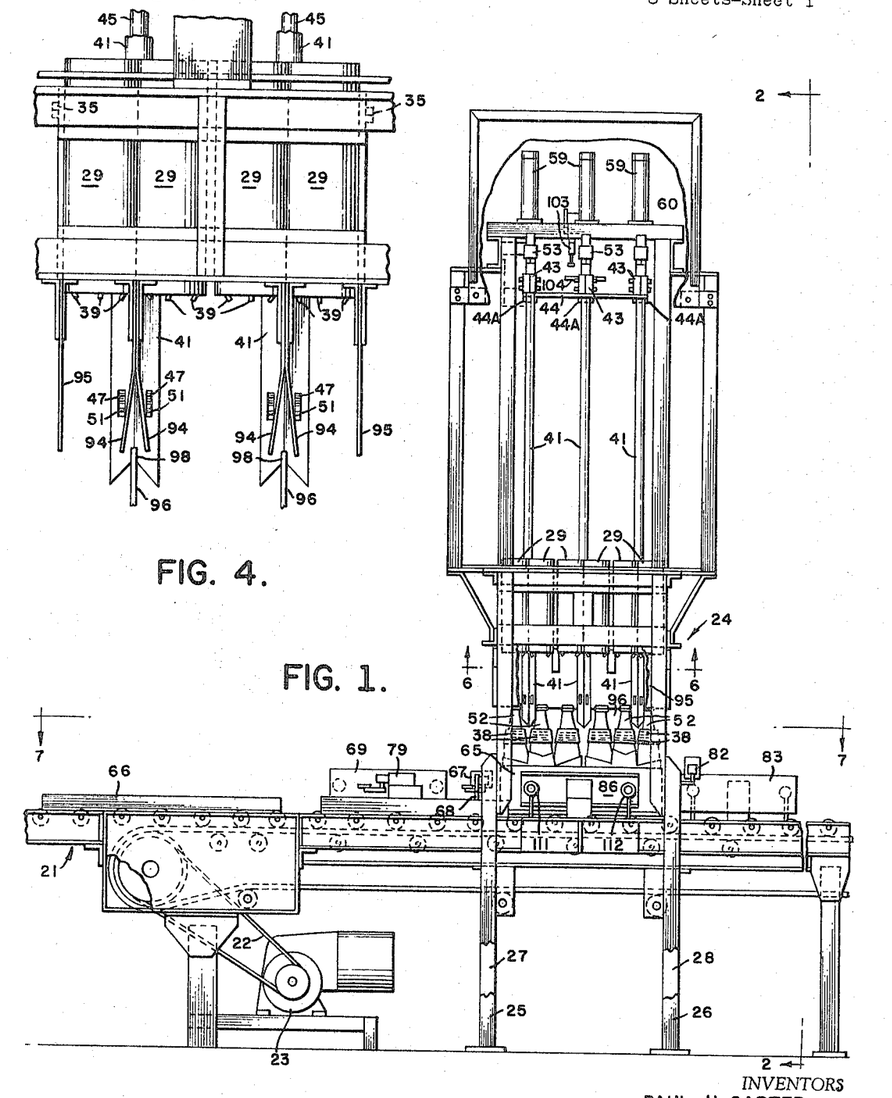
FIG. 1 (Sheet 1) is a side elevational view of an embodiment of the invention, partly broken away.
FIG. 4 (Sheet 1) is a side elevational view of the fragmentary portion shown in FIG. 3.
Figures 2, 8:
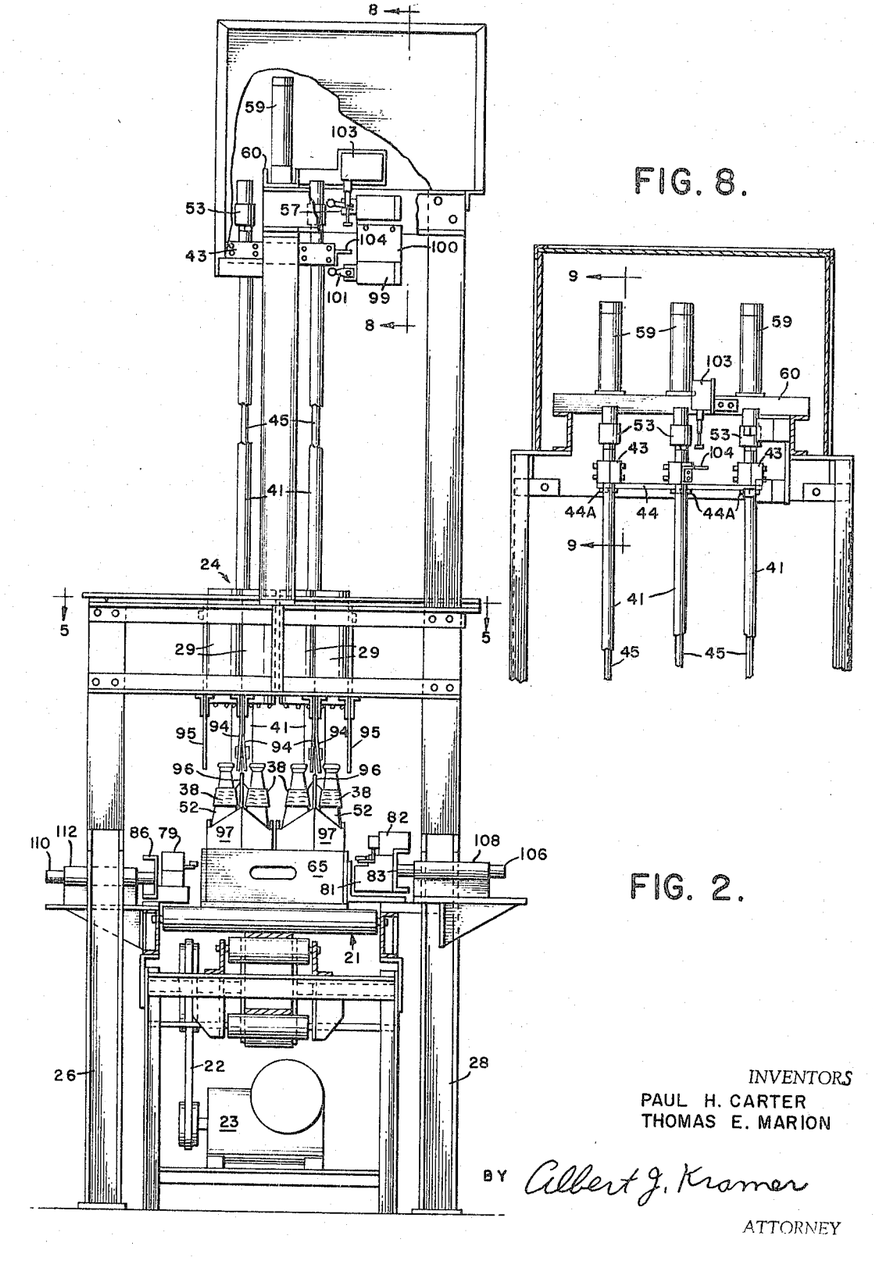
FIG. 2 (Sheet 2) is a section along the line 2—2 of FIG. 1.
FIG. 8 (Sheet 2) is a vertical sectional view along the line 8—8 of FIG. 2.
Figure 3:
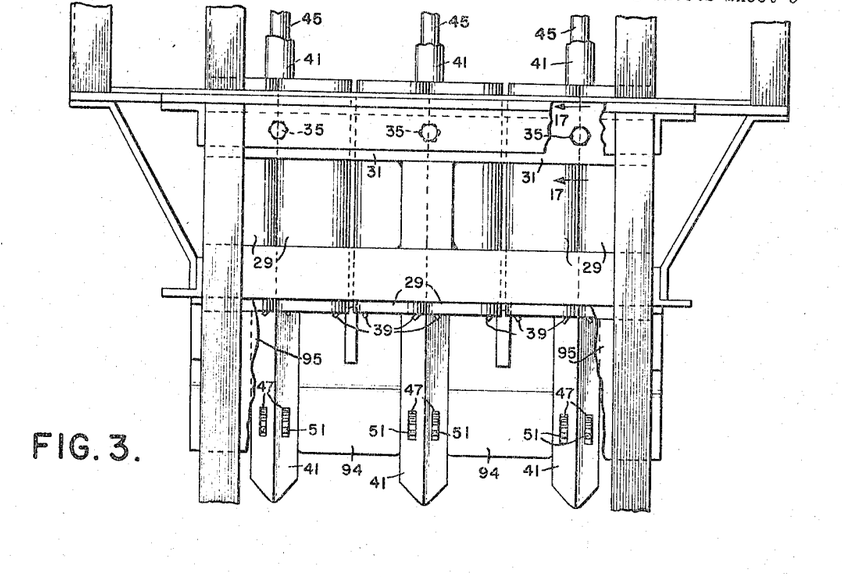
FIG. 3 (Sheet 3) is a side elevational view of a fragmentary portion of the embodiment on a larger scale.
Figures 5, 15, 16:
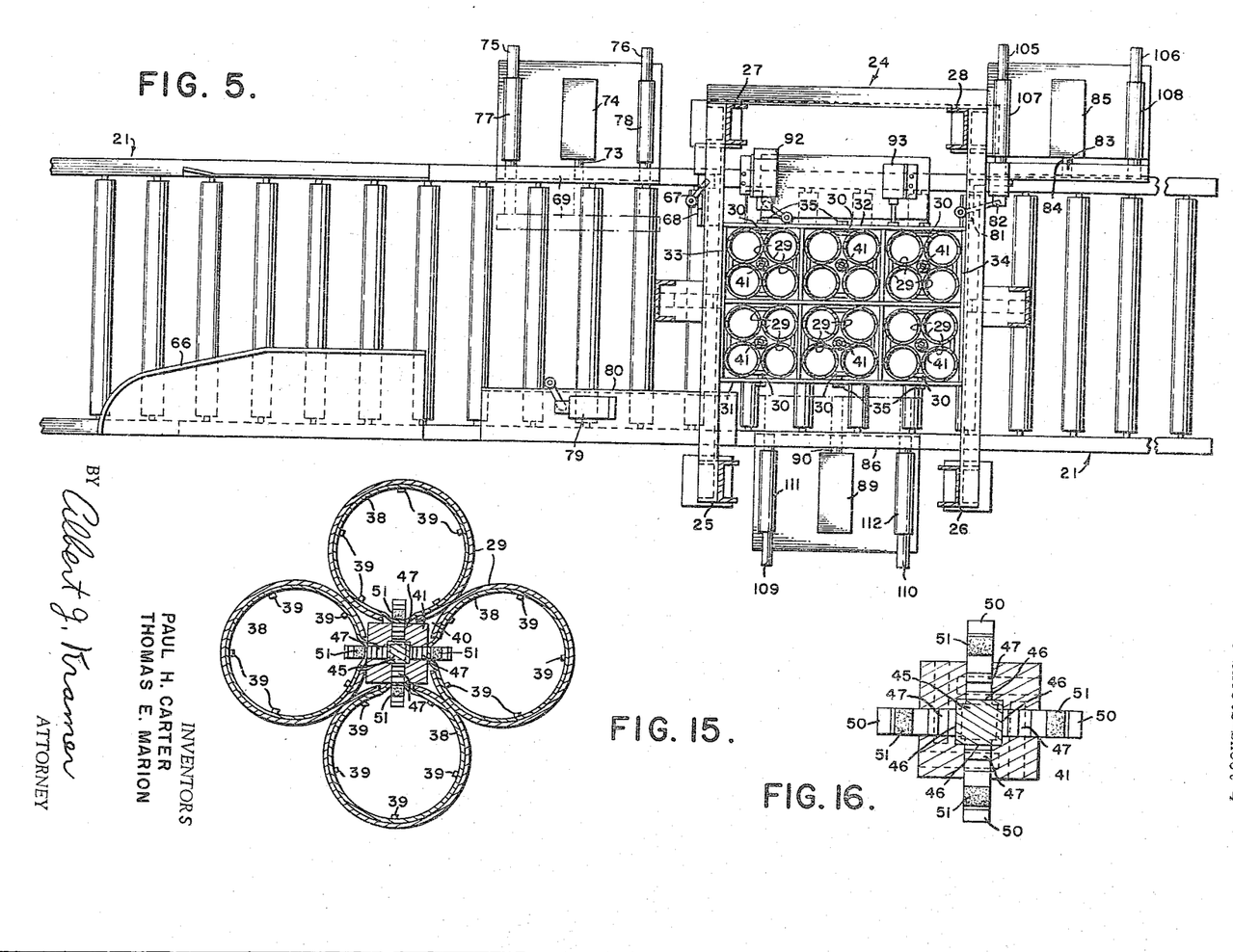
FIG. 5 (Sheet 4) is a plan sectional view along the line 5—5 of FIG. 2.
FIG. 15 (Sheet 4) is a plan sectional view along the line 15—15 of FIG. 12.
FIG. 16 (Sheet 4) is a cross-sectional view similar to FIG. 15 on a larger scale and without the stack supporting cylinders.
Figure 6:
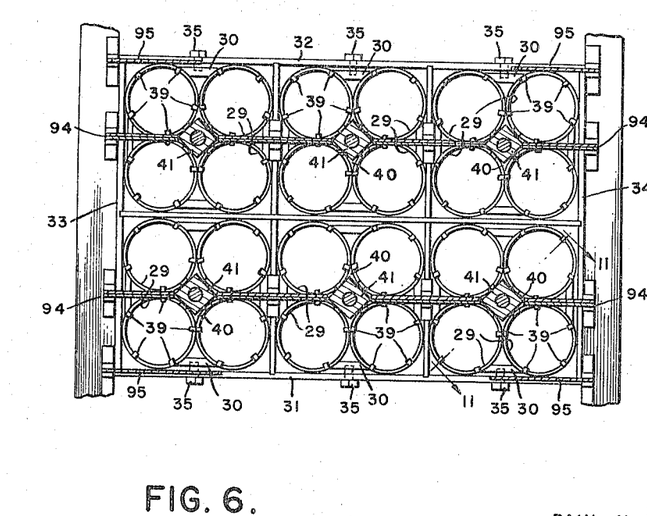
FIG. 6 (Sheet 3) is a plan sectional view along the line 6—6 of FIG. 1.
Figures 7, 9, 10:
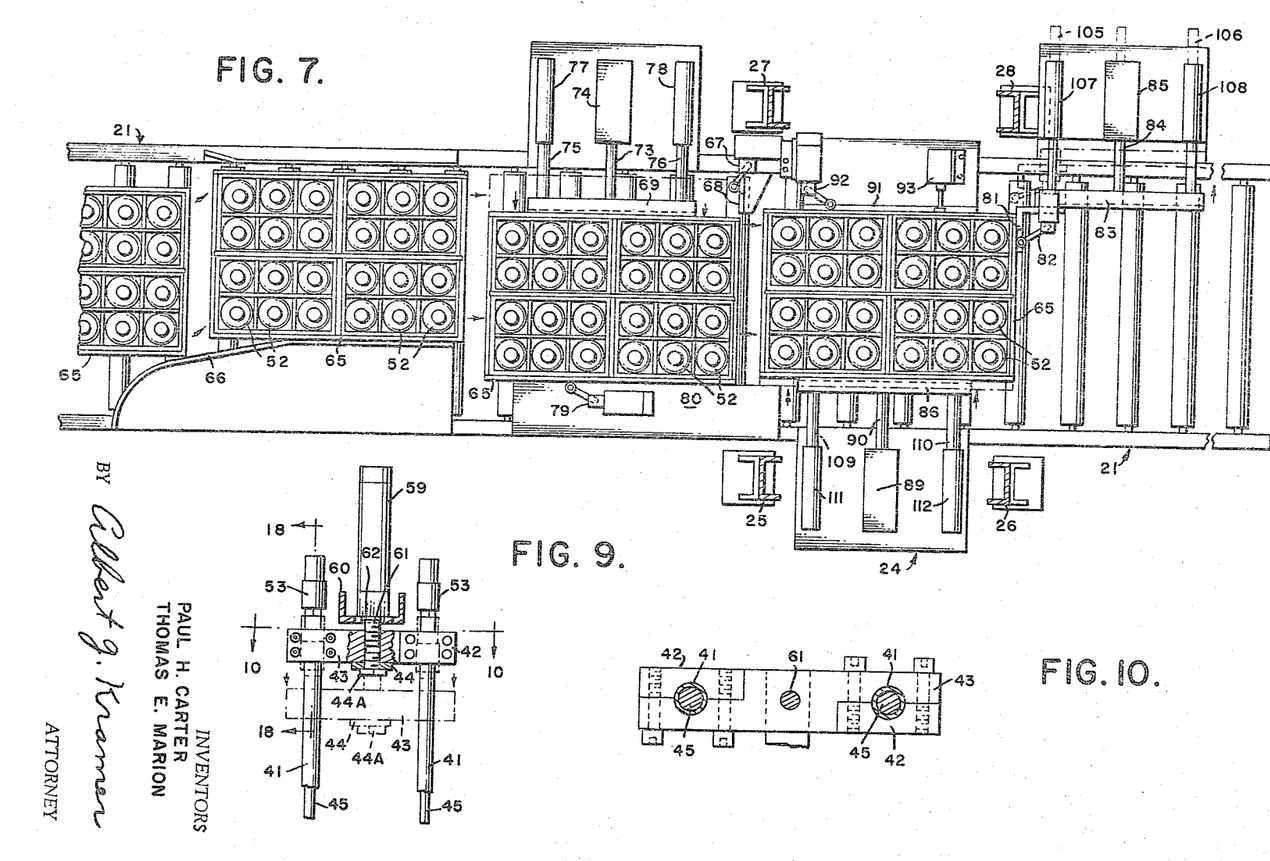
FIG. 7 (Sheet 5) is a plan sectional view along the line 7—7 of FIG. 1.
FIG. 9 (Sheet 5) is a vertical sectional view along the line 9—9 of FIG. 8.
FIG. 10 (Sheet 5) is a plan sectional view along the line 10—10 of FIG. 9.
Figure 11:
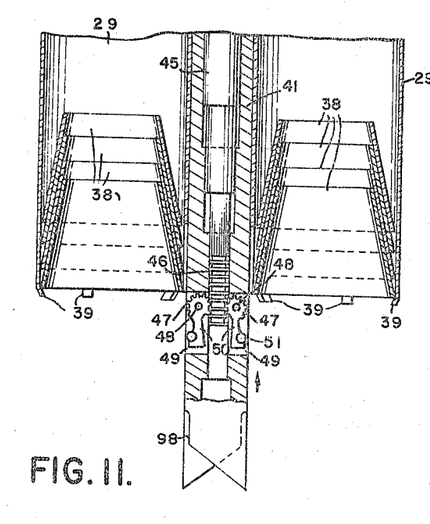
FIG. 11 (Sheet 6) is a sectional view along the diagonal line 11—11 of FIG. 6 showing the positions of the collars at the beginning of the cycle of operation.
Figure 12:
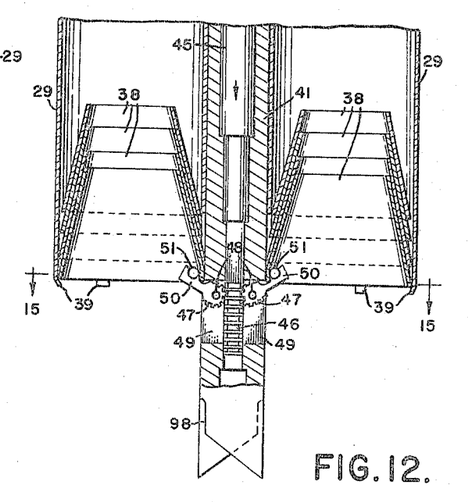
FIGS. 12, 13 and 14 (Sheet 6) are views similar to FIG. 11 but showing the mechanism in subsequent stages of the cycle of operation.
Figure 13:
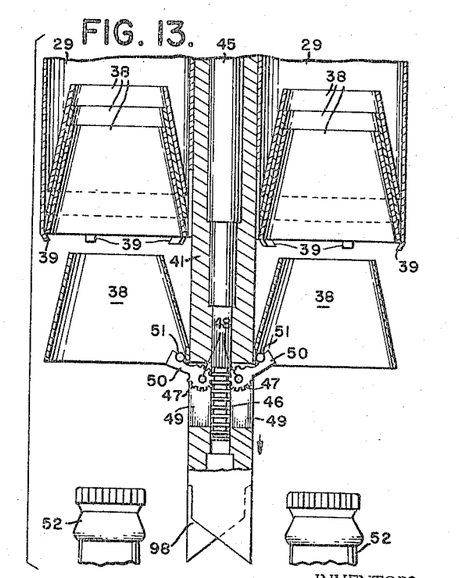
Figure 14:
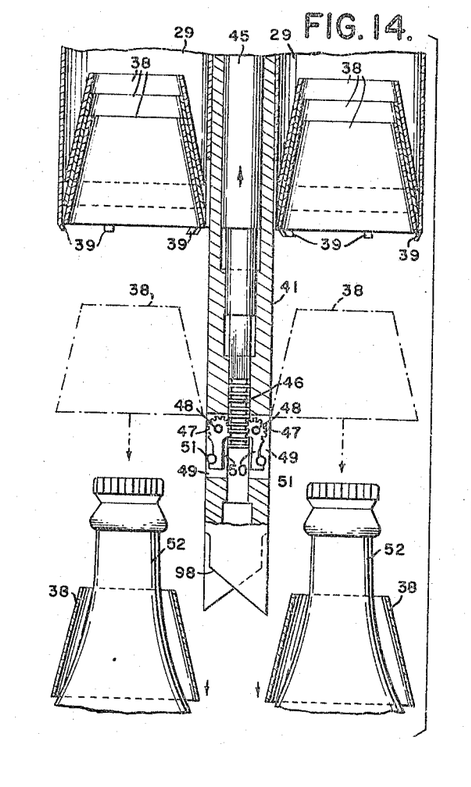
Figure 17:
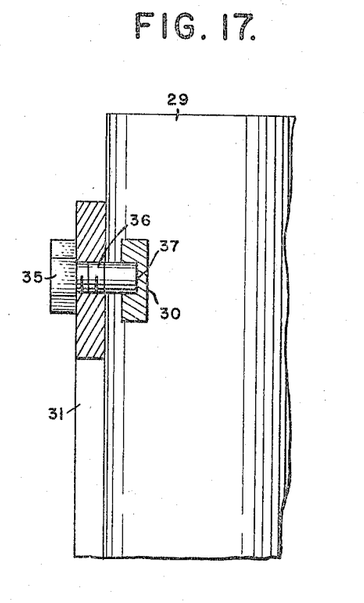
FIG. 17 (Sheet 8) is a sectional view along the line 17—17 of FIG. 3.

On the interior of each sleeve 41, there is slidably disposed for longitudinal reciprocation, a rod 45. The lower end of the rod 45 has a square coss-section and the hollow of the sleeve 41 in which this lower end reciprocates has a corresponding square cross-section (see FIGS. 15 and 16). The rod at this lower end is provided with rack teeth 46 on all four sides and each side engages one of a group of four pinions 47 that are rotatably mounted on pin shafts 48 in recesses 49 in the walls of the sleeve. These recesses are sufficiently long to contain finger extensions 50 of the pinions when moved to their non-operating positions. The fingers 50 are adapted to move from this recessed position to an outward and upward position for engaging the inner surfaces of the lowermost collars 38 of the stack of collars disposed in the tubes 29. The fingers are provided with rubber tips 51 to increase frictional contact with the collar surface. When in this engaging position, downward movement of the sleeves 41 will result in removal of the lowermost collar from the stack past the detents 39 and out of the bottom of the tubes 29. See FIG. 13. The collars thus removed will be released from the group of fingers by actuating the rods 45 to bring the fingers 50 wholly within the recesses 49 and thereby permit the collars to fall by gravity onto the necks of the bottles 52. The sleeves 41 and their corresponding rods 45 are then returned to their initial positions as shown in FIG. 11.

Figure 18:
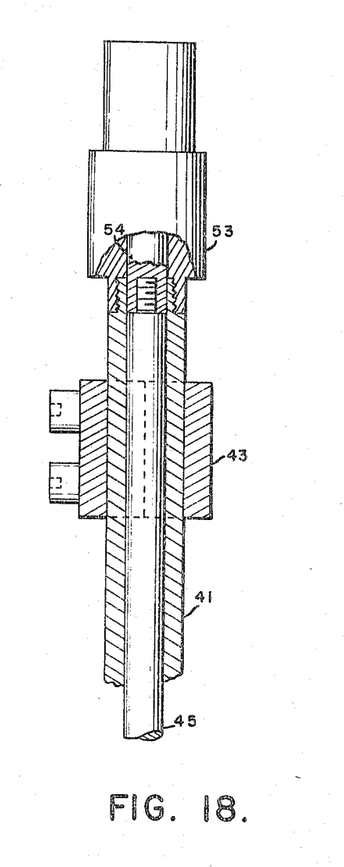
FIG. 18 (Sheet 8) is a sectional view along the line 18—18 of FIG. 9.
Figure 19:
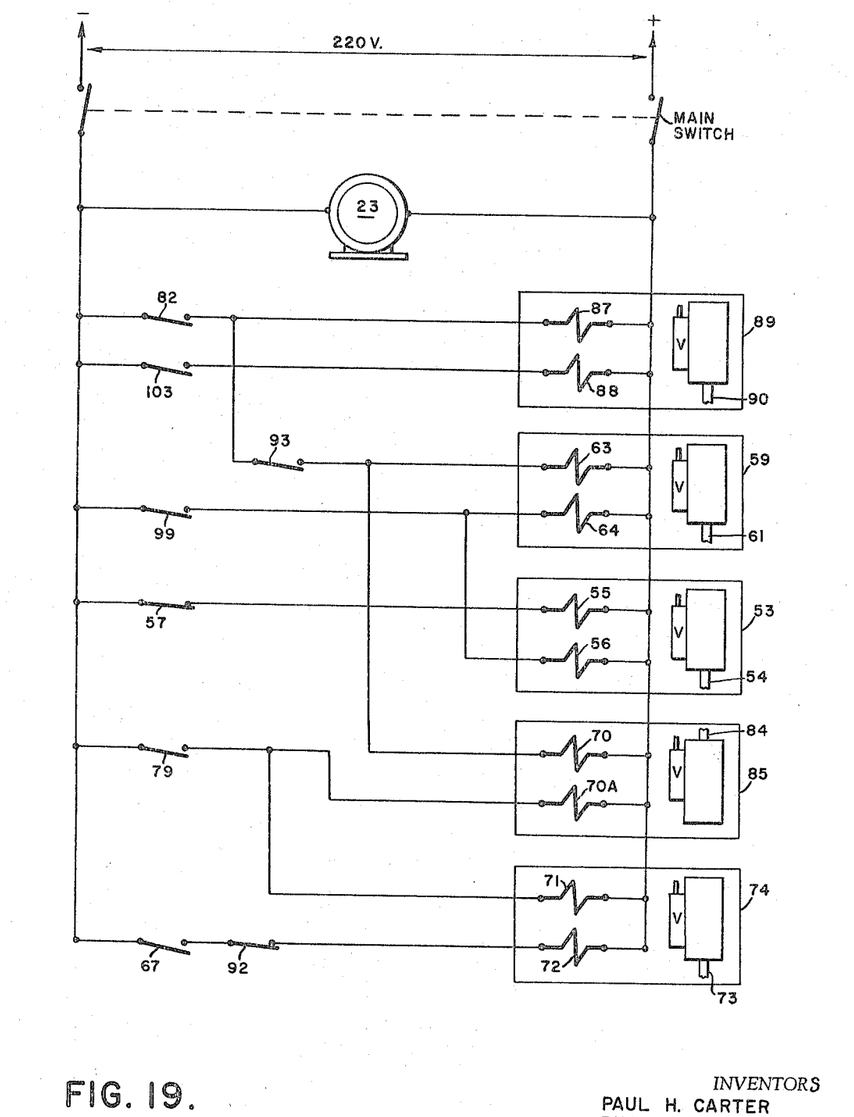
FIG. 19 (Sheet 7) is a schematic wiring diagram of the principal electrical elements.

The rods 45 are reciprocated relative to the sleeves 41 by means of conventional air motors 53, one for each sleeve. The air motors include conventional air valves and solenoids for opening and closing the valves. The housing of the motor in each case is secured to a sleeve 41 and the piston rod 54 is secured to the corresponding rod 45. (See FIG. 18.) The solenoids 55 and 56 comprising elements of these motors for actuating the air valves thereof are connected to an electrical circuit for simultaneous actuation, the circuit including a limit switch 57 mounted on the stationary frame member 58.

The sleeves 41 are moved vertically simultaneously by means of air motors 59 mounted on a cross beam 60. The housings of the air motors 59 are secured to the cross beam 60 and the piston rod 61 of each passing through an aperture 62 in the beam and being threadedly secured to one of the cross bars 43. The valve solenoids 63 and 64 of these air motors 59 are also connected by electrical circuit for simultaneous actuation.

As a case 65 of bottles 52 advances toward the dispenser unit 24, it is urged by a guide rail 66 to one side of the conveyor for alignment with an electrical limit switch 67 and an abutment 68. As the case continues toward the limit switch 68 it is positioned alongside a push bar 69 and is actually adjacent this push bar when it strikes the limit switch 67 and the abutment 68. Striking the limit switch excites air valve solenoid 72 causing protraction of the piston rod 73 of air motor 74 to which the center of the bar 69 is connected, thereby forcing the push bar 69 and the case 65 of bottles to the opposite side of the conveyor. The ends of the push bar 69 are connected to and stabilized by guide rods 75 and 76 that slidably engage stationary sleeves 77 and 78, respectively.

As the case of bottles moves to the opposite side of the conveyor it contacts a limit switch 79 and an abutment 80 and at the same time is moved forwardly by the roller conveyor 21 on disengaging the abutment 68.

Striking the switch 79 causes a reversal of air to the air motor 74 by exciting its air valve solenoid 71 and a consequent retraction of the piston rod 73 and push bar 69 to the initial position in preparation for a succeeding case of bottles. This switch also causes a retraction of rod 84 of air motor 85 through excitation of its air valve solenoid 70A.

The preceding case of bottles advances to an abutment 81 and a limit switch 82 carried by a bar 83. This bar is connected to the position rod 84 of air motor 85. The rod 84 is normally in a protracted position in the path of travel of the cases. When the case strikes the switch 82 it is in a position alongside a push bar 86 on the opposite side of the conveyor. The striking of this switch actuates the valve solenoid 87 of an air motor 89 to protract the piston rod 90 connected to the push bar 86 and thereby move the case of bottles to the other side of the conveyor against a fixed abutment 91. Guide rods 105 and 106 in sleeves 107 and 108, respectively, are provided for the bar 83 and function the same as those associated with the bar 69.

Associated with the abutment 91 is a limit switch 92 and a pulse switch 93. Striking the limit switch 92 opens the electrical circuit of the first limit switch 67 to prevent actuation of the air motor 74 by a succeeding case striking the switch 67 while a preceding case is in position against the abutment 91.

Actuation of the pulse switch 93 by the case in moving against the abutment 91 causes a simultaneous actuation of valve solenoids of the air motors 59 to urge their piston rods 61 downwardly. This causes the sleeves 41 and rods 45 to move downwardly simultaneously from an initial position as shown in FIG. 11 to the position shown in FIG. 13. In the initial position, the fingers 50 are, as shown, in gripping contact with the inside surfaces of the lowermost collar in each stack. Accordingly, when the piston rods 61 of air motors 59 are actuated downwardly, these lowermost collars are removed from their corresponding stacks. These collars are then released by movement of the rods 45 upwardly while holding the sleeves 41 stationary. This movement causes the fingers to retract within the recesses 49 of the sleeves, whereby the collars are free to fall onto the bottles of the case. Actuation of switch 93 also causes protraction of the piston rod 84 of air motor 85 through excitation of its air valve solenoid 70.

Inside guide skirts 94 and outside guide skirts 95 are provided to insure proper positioning of the collars on the bottles as they fall. The lower ends of the sleeves 41 are bifurcated to straddle the panels 96 of 6-Paks 97 when such Paks are used and notches 98 engages the top edges of and retain the panels in proper position to prevent interference with the collars falling on the bottles.

Actuation of the rods 45 upwardly relative to the sleeves 41 is effected by reversal of air motors 53. The valve solenoids 55 of these motors are excited for this purpose by switch 57. Another switch 99 is mounted on a bracket 100 and is actuated by contact with a member 101 on one of the bars 43. This switch causes a reversal of the air motors 59 and 53 by excitation of air valve solenoids 64 and 56, respectively, thereby elevating both the sleeves 41 and the rods 45 simultaneously to the position shown in FIG. 11.

Retraction of the piston rod 84 of the air motor 85 through actuation of pulse switch 93 has the effect of withdrawing the abutment 81 and limit switch 82 to a position out of the path of the preceding case of bottles but this case is still held against longitudinal movement by the bar 86 and abutment 91.

The cycle of operation is completed by actuation of a pulse switch 103 by means of an abutment 104 secured to and movable with one of the bars 43. This has the effect of moving the rods 45 downwardly relative to the sleeves 41 and thereby positioning the fingers 50 to their initial positions as shown in FIG. 11. This switch also causes the actuation of the valve solenoids of the air motor 89 to effect retraction of its piston rod 90 and withdrawal of the push bar 86 whereupon the case is released and permitted to resume longitudinal movement under the action of the conveyor. The bar 86 is also stabilized by guide rods 109 and 110 sliding in stationary sleeves 111 and 112, respectively, as in the case of the bar 69.

Having thus described our invention, we claim:

1. A machine for assembling collars over the necks of bottles comprising an elongated sleeve, a rack rod axially movable within the sleeve, said sleeve having a transverse slot extending through its wall on one side, a pinion gear rotatably mounted in said slot in meshed relation with the rack rod, a finger integrally connected to the pinion for pivoted movement therewith between protracted and retracted positions, said finger being adapted in its protracted position to clamp and hold against the sleeve a collar to be assembled, and to be recessed in said slot in its retracted position, means for translating the sleeve axially to an extended position while the finger is in its protracted position and for retracting the finger after the sleeve reaches its extended position, and means for supporting bottles relative to the sleeve in collar receiving position.

2. A machine as defined by claim 1 and abutment means between the sleeve and rack rod for limiting the relative axial movement therebetween.

3. A machine for assembling collars over the necks of bottles comprising an elongated sleeve, a rack rod within the sleeve, a group of fingers pivoted each to a different side of the sleeve, said rack rod having rack teeth integrally connected to pivotally move the fingers simultaneously between protracted positions and retracted positions, each said finger being adapted in its protracted position to clamp and hold against the sleeve a collar to be assembled, means for translating the sleeve axially to an extended position while the fingers are in their protracted positions and for retracting the fingers after the sleeve reaches its extended position, and means for supporting bottles relative to the sleeve in collar receiving position.

4. A machine as defined by claim 3 in which the sleeve is provided with recesses corresponding to the fingers to receive the fingers in their retracted positions respectively.

5. A machine as defined by claim 3 in which the fingers are each integral with a pinion rotatably mounted on the sleeve, said sleeve having transverse slots in which the pinions are disposed respectively, said pinions extending inwardly through the slots to mesh with the rack teeth.

6. A machine as defined by claim 3 and a conveyor for moving a group of bottles from a bottle receiving station through a collar receiving station to a bottle discharge station.

7. A machine as defined by claim 6 and means for automatically arresting movement of the group of bottles by the conveyor when it reaches the collar receiving station and for automatically resuming movement of the bottles by the conveyor after the collars have been assembled on the necks to move the bottles with the collars thereon to the bottle discharge station.

References Cited
UNITED STATES PATENTS

| | | | |
|---|---|---|---|
| 1,971,576 | 8/1934 | Nelson | 29—208 |
| 2,852,899 | 9/1958 | Murrell | 29—208 |

JOHN F. CAMPBELL, *Primary Examiner.*

THOMAS H. EAGER, *Examiner.*